(12) United States Patent
Hook et al.

(10) Patent No.: US 8,916,262 B2
(45) Date of Patent: Dec. 23, 2014

(54) COMPOSITE MATERIALS AND STRUCTURES

(75) Inventors: Patrick Barry Hook, Witheridge (GB); Kenneth E. Evans, Exeter (GB); Jonathan Paul Hannington, Rhondda Cynon Taff (GB); Claire Hartmann-Thompson, Midland, MI (US); Timothy Rex Bunce, Vale of Glamorgan (GB)

(73) Assignee: Dow Corning Corporation, Midland, MI (US)

( * ) Notice: Subject to any disclaimer, the term of this patent is extended or adjusted under 35 U.S.C. 154(b) by 613 days.

(21) Appl. No.: 12/467,966

(22) Filed: May 18, 2009

(65) Prior Publication Data

US 2009/0239049 A1    Sep. 24, 2009

Related U.S. Application Data

(62) Division of application No. 10/551,316, filed as application No. PCT/GB2004/001320 on Mar. 26, 2004, now abandoned.

(30) Foreign Application Priority Data

Mar. 29, 2003 (GB) .................................. 0307330.1

(51) Int. Cl.
*D02G 3/38* (2006.01)

(52) U.S. Cl.
CPC ........................................ *D02G 3/38* (2013.01)
USPC ........... 428/212; 428/373; 428/375; 428/377; 442/361

(58) Field of Classification Search
CPC ............. D02G 3/38; D07B 2201/2061; D07B 2201/2055; D07B 1/0613; D07B 2801/10; D07B 1/062; D07B 2201/2092; D07B 2201/2098; D07G 2201/2069
USPC .................. 428/373, 212; 209/235; 606/198; 264/176.1; 442/361; 57/214, 231, 244
See application file for complete search history.

(56) References Cited

U.S. PATENT DOCUMENTS 2,448,782 A    9/1948  Davis
3,625,809 A  * 12/1971  Caroselli et al. .............. 428/222

(Continued)

FOREIGN PATENT DOCUMENTS

CN    1273288 A    11/2000
EP    0373641 A2    6/1990

(Continued)

OTHER PUBLICATIONS

English language abstract for JP 10134102 extracted from the esapcenet.com database on Oct. 26, 2012, 8 pages.

(Continued)

*Primary Examiner* — Elizabeth Cole
(74) *Attorney, Agent, or Firm* — Howard & Howard Attorneys PLLC

(57) ABSTRACT

The invention provides composite components, structures and method for producing composite components. A composite component has a negative effect Poisson's ratio and comprises a first component and a second component. The first component and the second component extend longitudinally relative to an axis, the first component being provided around the second component through one or more turns which are spaced longitudinally relative to the axis. A variation in the tensile load on the first component causes the radial position of the second component relative to the axis to vary.

18 Claims, 4 Drawing Sheets

(56) References Cited

U.S. PATENT DOCUMENTS

| | | | |
|---|---|---|---|
| 3,631,667 A * | 1/1972 | Marzocchi | 57/7 |
| 4,028,874 A | 6/1977 | Maag et al. | |
| 4,155,394 A | 5/1979 | Shepherd et al. | |
| 4,668,557 A | 5/1987 | Lakes | |
| 4,809,493 A | 3/1989 | Genba et al. | |
| 5,429,869 A | 7/1995 | McGregor et al. | |
| 6,100,311 A | 8/2000 | Eling | |
| 6,460,588 B1 * | 10/2002 | Westgate et al. | 152/527 |
| 7,858,055 B2 | 12/2010 | Lee | |
| 8,191,429 B2 | 6/2012 | Hook | |
| 8,225,729 B2 | 7/2012 | MacDonald | |
| 2003/0042176 A1 | 3/2003 | Alderson et al. | |
| 2011/0039088 A1 | 2/2011 | Lee | |

FOREIGN PATENT DOCUMENTS

| | | |
|---|---|---|
| EP | 0820858 A1 | 1/1998 |
| GB | 2235200 A | 2/1991 |
| GB | 2235650 A | 3/1991 |
| GB | 2347096 A | 8/2000 |
| JP | H0250084 | 1/1988 |
| JP | 10-134102 | 5/1998 |
| RU | 2201941 C2 | 4/2003 |
| WO | WO 88/00523 | 1/1988 |
| WO | WO 9101210 | 7/1991 |
| WO | WO 0053830 A1 * | 9/2000 |
| WO | WO 0216463 | 2/2002 |

OTHER PUBLICATIONS

US 7,790,123, 09/2010, WanKuk Lee (withdrawn).

English language abstract for CN1273288A extracted from the espacenet.com database on Feb. 12, 2013, 14 pages.

English language abstract for RU 2201941C2 extracted from the espacenet.com database on Feb. 12, 2013, 2 pages.

English language abstract for JP H02500894 extracted from the espacenet.com database on Feb. 12, 2013, 6 pages.

* cited by examiner

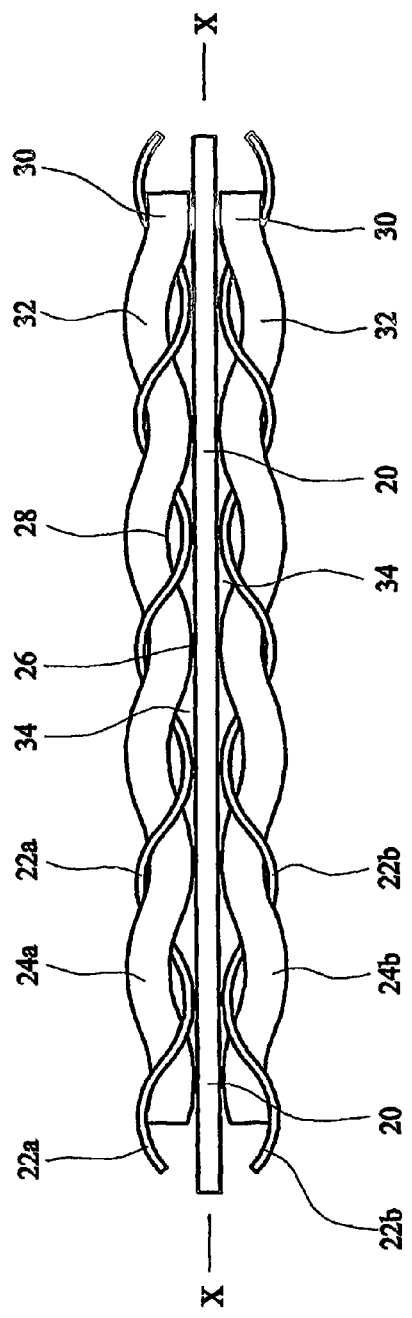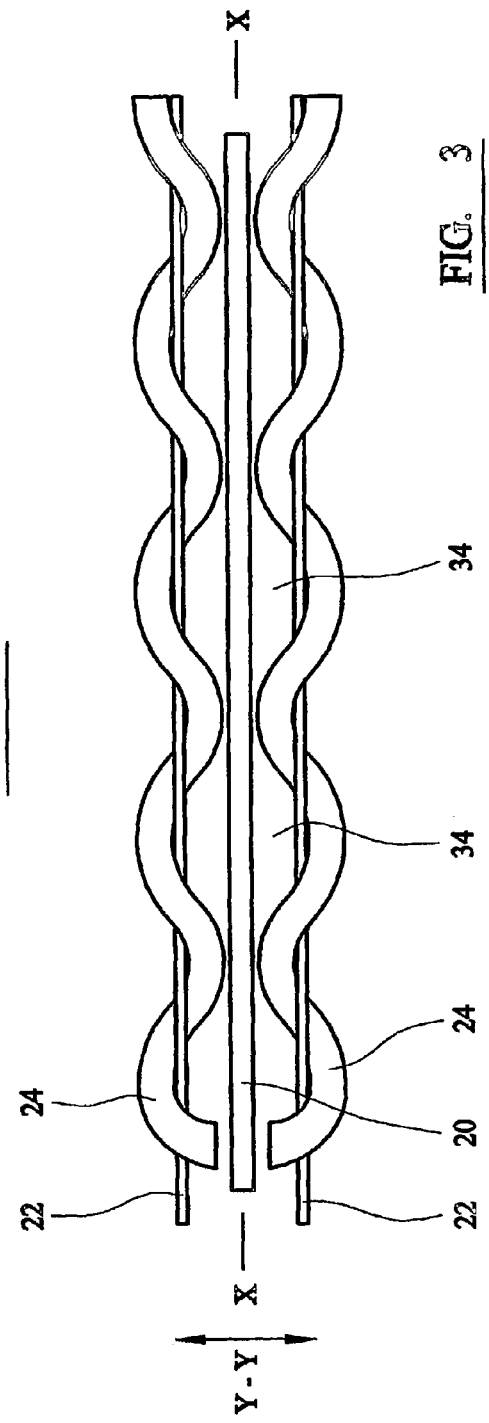

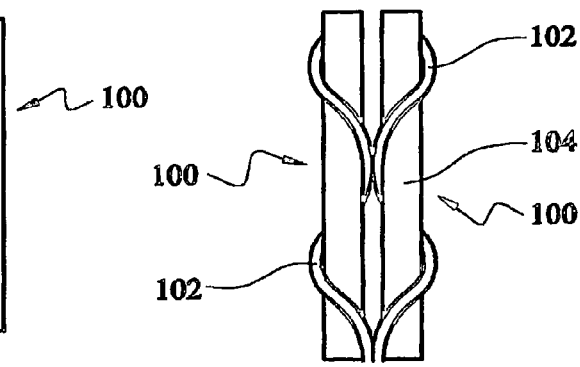
FIG. 8a     FIG. 8b     FIG. 8c
FIG. 8d     FIG. 8e     FIG. 8f
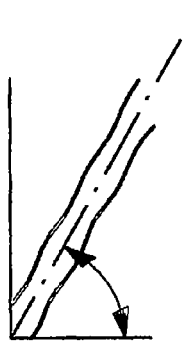
FIG. 9a     FIG. 9b

COMPOSITE MATERIALS AND STRUCTURES

RELATED APPLICATIONS

This application is a divisional of U.S. patent application Ser. No. 10/551,316, filed Jun. 9, 2006, entitled IMPROVEMENTS IN AND RELATING TO COMPOSITE MATERIALS AND STRUCTURES, which claims priority to PCT Patent Application No. PCT/GB04/01320, filed Mar. 26, 2004, both of which are incorporated herein by reference.

FIELD OF THE INVENTION

This invention is concerned with improvements in & relating to composite materials and structures, particularly those with auxetic properties (i.e. with a negative or effectively negative Poisson's ratio), methods of producing auxetic composite materials and applications for auxetic composite materials.

BACKGROUND OF THE INVENTION

Unlike most conventional materials auxetic materials expand perpendicular to an axis about which they are stretched. This gives such materials a variety of useful properties. Existing auxetic materials and the techniques for their production, such as those detailed in WO00/53830, face significant problems in producing auxetic materials in a reliable manner and/or on a scale suitable for industrialisation. Additionally such prior art materials are formed from a single material and thus have restricted properties as a result. The present invention aims to address problems with prior art materials and their production techniques.

The present invention has amongst its aims the provision of improved auxetic composite materials, methods of manufacturing auxetic composite materials and applications for auxetic composite materials. Methods of manufacturing are envisioned that aim to be appropriate for industrial scale production or fabrication at a wide range of scales. The present invention has amongst its aims the provision of auxetic composite materials and methods for producing such materials which are reliable in their structure and properties and which would offer a greater range of material properties and uses.

SUMMARY OF THE INVENTION

According to a first aspect of the present invention we provide a composite component having a negative effective Poisson's ratio, the composite component including a first component and a second component, the first component and the second component extending longitudinally relative to an axis, the first component being wrapped around the second component through one or more turns, the one or more turns being spaced longitudinally relative to the axis, variation in the tensile load on the first component causing the radial position of the second component relative to the axis to vary.

According to a second aspect of the invention we provide a composite component having a negative effective Poisson's ratio, the composite component including a first component and a second component, the first component and second component extending longitudinally relative to an axis, the first component being wrapped around the second component through one or more turns, the first component having a higher modulus of elasticity than the second component, variation in the tensile or compressive load on the first component causing the radial position of the second component relative to the axis to vary.

According to a third aspect of the invention we provide a composite component having a negative effective Poisson's ratio, the composite component including a first component and a second component, the first component and the second component extending longitudinally relative to an axis, the first component being wrapped around the second component in a helical manner, variation in the tensile or compressive load on the first component causing variation in the diameter of the helix the first component follows, the variation in the diameter of the helix of the first component causing the second component to take on the form of a helix and/or causing the diameter of the helix of the second component to vary, the diameter of the second component helix increasing as the first component helix decreases in diameter, the diameter of the second component helix decreasing as the first component helix increases in diameter.

The first and/or second and/or third aspects of the invention may include any of the features, options or possibilities set out elsewhere in this document and particularly from amongst the following.

The composite component and/or a structure produced there from may have any negative value of Poisson's ratio. The system may have a Poisson's ratio of between 0 and −5. A Poisson's ratio of between −3 and −4 may particularly be provided.

The first component may be a fibre, rod or hollow tube particularly of a relatively high modulus material. The first component may be formed of carbon fibre, glass fibre, polyaramids(e.g. Kevlar™), polyamides (e.g. nylon), polyesters, polyalkylenes, polyethyleneterepthalate(PET), metal wire, cotton or other material. The materials from which the first component is formed may be natural or man made, inorganic or organic. The first component may be sealed with a cured film, for example a cured siloxane film. In the event that the first component is a hollow tube, the tube may contain additional materials.

The second component may be a fibre, rod or hollow tube, particularly consisting of an intermediate or a low modulus material. The material is preferably capable of deformation without fracture. The second component may be formed of siloxane, liquid silicone rubber, natural rubber, nitrile rubber or any other elastomeric material whether natural or manmade. In the event that the second component is a hollow tube, the tube may contain additional materials. The additional materials may or may not be auxetic. The additional materials may have different properties to the tubing.

Preferably the first component is of a higher modulus than the second component. The first component may have a diameter that is between 0.01 and 1 times the diameter of the second component. The first component may be between 0.001 and 1 times the cross-sectional area of the second component.

The first component and/or second component may be formed of a continuous material. Preferably the first component and/or second component are elongate. The first component and/or second component may be at least a hundred times as long as their maximum cross-sectional dimension or extent.

The axis may be provided at the centre of a composite component consisting of a first component and second component. The axis may be provided between two or more components. The axis may be provided through a core component, particularly the centre of a core component, around which one or more first components and/or second components are provided.

The wrapping of the first component around the second component may be provided in the form of a covering or winding. The wrapping of the first component around the second component may be in the form of a spiral or a helix. The spiral or helix may have a constant pitch along the second component. The pitch may be between zero degrees and ninety degrees relative to the axis.

The second component may be linear with the first component wrapped around it. The second component may also be wrapped around the first component. The second component may be in the form of a spiral or a helix. The pitch of the first component spiral or helix may be the same as the pitch of the second component spiral or helix.

The variation in the tensile or compressive load on the first component may be a variation in the load applied along or parallel to the axis. The variation in the load may be an increase in the load. The variation in the load may be a decrease in the load. The first component may have the load increased from zero to a load value to cause the variation, or may have the load reduced from a first value to a second lower value to cause the variation. The load may be applied at the ends of the first component and/or may be introduced at an intermediate location.

The radial position of the second component may be measured perpendicular to the axis. Preferably the variation in radial position is an increase in the displacement of at least a part of the second component relative to the axis when the load is varied, the variation particularly being an increase when the load is a tensile load and a decrease when the load is a compressive load. Preferably the variation in radial position is a decrease in the displacement of at least a part of the second component from the axis when the load is varied, the variation particularly being a decrease when the load is a tensile load and an increase when the load is a compressive load. The position of some parts of the second component may not feature a displacement increase when the load is varied.

Preferably a structure includes at least a pair of composite components, each composite component including a first component and a second component. The pair of composite components may be arranged adjacent to one another or in contact with one another. Contact may be between the first elements of the composite components and/or between the second components of the composite components. Two or more composite components may be arranged around a core component. The first and/or second components of the composite component may be provided adjacent to or in contact with the core component.

A bulk structure may be formed from repeats of a unit comprising multiple composite components. A core element may be provided between composite components and/or between units formed of multiple composite components. A core component may be provided at the core of a unit with two or more composite components provided around the core component. The composite components may be evenly spaced around the core component. Each composite component may be provided adjacent to, or in contact with other core components. A bulk structure may be formed from repeats of a unit comprising multiple composite components and multiple core components.

A bulk structure may be provided by each composite component being provided adjacent to or in contact with two or more other composite components. A planar or sheet type bulk structure may be provided by providing alongside one another repeats of a unit formed of a first composite component, with a further composite component to either side. A core component may be provided between composite components in such a structure. Preferably each unit is adjacent to or contacts two other units.

A bulk structure may be provided by each composite component being provided adjacent to or in contact with four other composite components. The bulk structure may be formed of units comprising four composite components, particularly provided around a single core component. Preferably each unit is adjacent to or contacts four or eight other units.

A bulk structure may be provided by each composite component being provided adjacent to or in contact with five other composite components. The bulk structure may be formed of units comprising five composite components, particularly provided around a single core component. Preferably each unit is provided adjacent to or in contact with five other units.

A bulk structure may be formed by each composite component being provided adjacent to or in contact with six other composite components. The bulk structure may be formed of units comprising six composite components. A core element may be provided between the six composite components. The six composite components may be even spaced around the core element. Preferably each unit is provided adjacent to or in contact with six other units.

Adjacent composite components, including those with in units and bulk structures, may be provided with first components that are wrapped around the second component in opposite directions to one another.

In one preferred embodiment of the invention a structure is provided formed of a first composite component and a further composite component, the first composite component has a first component wrapped around the second component in one direction and the further composite component has a first component wrapped around the second component in the other direction. Preferably at least one of the composite components is wrapped clockwise and at least one of the composite components is wrapped anti-clockwise, ideally so that two composite components opposite each other are the mirror image of each other. A core element may be provided between the two or more composite components.

In an alternative embodiment of the invention a structure is provided formed of two or more of composite components, two or more, or even all, of the composite components having a first component which is wrapped around the second component in identical orientations such that they are not mirror images. A core element may be provided between the two or more composite components.

The structure may be provided with one or more core components, particularly core components provided between at least two composite components. The core component may be a fibre. The core component may be solid or hollow. The hollow core components may contain additional materials or be filled with additional materials. The core components and/or additional materials may be formed from a further auxetic material. The first component and/or the second component may be discrete from the core element. All three components may be discrete from one another. It is preferred that the first and second components are provided so that there is no movement of the components over each other. The core component may also be provided within the composite structure such that no movement of the core component over the first and/or second components occurs.

The structure may include one or more matrix components. The matrix components may be, or may include siloxane foams, polyurethane foams or other such materials. Preferably the matrix components are in contact with all the composite components, or at least the first component and/or the second component. The matrix component may be deformed by the variation in the tensile or compressive load on the first component and/or may resist the movement of the second component caused by load variation. The matrix component may encourage the return of the second component to the radial position it occupied prior to load variation. The matrix component may amplify the negative Poisson's ratio, or auxetic effect, of the structure and/or material.

Preferably an increase in the tensile load or a reduction in the compressive load causes the first components to become more linear and the second components to become less linear. Preferably a reduction in the tensile load or an increase in the compressive load causes the first components to become less linear and the second components to become more linear.

The structure may be energy absorbing, for instance suitable for impact absorption and/or acoustic absorption applications. The structures may be formed or woven into car parts, sports equipment, aerospace components, moulded components, Piezo-electric materials, textiles, fabrics and the like. In particular the structures may be formed or woven into automotive bumpers, automotive interiors, automotive and aerospace tyres, tubing for flight suits, body armour, biomaterials for prostheses or other medical uses, padding, damping materials for electronic devices, including hand-held devices, personal computers, communications equipment, cameras and the like.

The structures may also be effective in applications relating to strain loads where the intent is to support heavy objects or forces across a wide surface area. The composite structures may be formed or woven into webbings, belts and straps, textiles, fabrics, for tyre carcass construction, etc.

According to a fourth aspect of the invention we provide a method for producing a composite component having a negative effective Poisson's ratio, the method comprising forming a first component; forming a second component; applying, for instance by wrapping and/or spinning and/or covering, the first component around the second component through one or more turns, the one or more turns being spaced longitudinally along the second component.

According to a fifth aspect of the invention we provide a method for producing a composite component having a negative effective Poisson's ratio, the method comprising forming a first component; forming a second component; applying, for instance by wrapping and/or spinning and/or covering, the first component around the second component through one or more turns, the modulus of elasticity of the first component being greater than the modulus of elasticity of the second component.

According to a sixth aspect of the invention we provide a method for producing a composite component having a negative effective Poisson's ratio, the method including forming a first component; forming a second component; the first component and the second component extending longitudinally relative to an axis; applying the first component around the second component in a helical manner, for instance by wrapping and/or spinning and/or covering, variation in the tensile or compressive load on the first component causing variation in the diameter of the helix the first component follows, the variation in the diameter of the helix of the first component causing the second component to take on the form of a helix and/or causing the diameter of the helix of the second component to vary, the diameter of the second component helix increasing as the first component helix decreases in diameter, the diameter of the second component helix decreasing as the first component helix increases in diameter.

The fourth and/or fifth and/or sixth aspect of the invention may include any of the features upon options or possibilities set out elsewhere in this document and particularly from the following:

The first component and/or the second component and/or core component may be extruded or pultruded, e.g. by a die with or without tension, The first component and/or the second component and/or core component may be formed by a spinnerette or similar spiral winding/covering device. The second component may be stretched whilst the first component is wrapped around the second component.

The first component and/or the second component may be formed and then applied, for instance wrapped. The first component may be applied around the second component as it is formed. The first component and the second component may form a composite component. Two or more composite components may be bundled together. The composite components may be bundled together to form a structure, for instance by packing them around one or more core elements.

The method may include a matrix providing or not a void filling step for the one or more components. The voids may be filled with fibres and/or bulk material or matrix. Siloxane foams, polyurethane foams, liquid silicone rubbers, natural rubber and other synthetic or natural materials may be used to form the matrix or act as void fillers.

The first component and the second component, or composite components made therefrom, or structures or bundles made therefrom, may be woven to produce structure or may be introduced to a moulding process to form bulk structures.

BRIEF DESCRIPTION OF THE DRAWINGS

Various embodiments of the invention will now be described, with reference to the accompanying drawings in which:—

FIG. 2 illustrates an auxetic composite structure according to the present invention in an unstrained/partially strained state;

FIG. 3 illustrates the composite structure of FIG. 2 in a strained state;

FIGS. 8a to 8f illustrate various views of an experimental embodiment of the present invention at various strain levels; and FIGS. 9a and 9b illustrate the projected angle for the first component in an unstrained and partially strained form respectively.

DETAILED DESCRIPRTION OF THE PREFERRED EMBODIMENTS

This invention is aimed at providing improved structures & production techniques for auxetic materials, as well as improved auxetic materials themselves. It should be noted that where the term materials is used, it is taken that this includes textiles and fabrics amongst other possibilities.

Auxetic materials are materials having a negative actual or effective Poisson ratio. That is to say, when a tensile load is applied to an auxetic material to stretch it along a first axis it expands along a second axis perpendicular to that first axis. Materials are also auxetic if a compressive load is applied along the axis of a material and the compression results in a reduction in width along a second axis perpendicular to that first axis. This is contrary to the behaviour of most materials which exhibit a positive Poisson ratio. A material's Poisson ratio is determined by the ratio of the contractile transverse strain relative to the tensile longitudinal strain.

Synthetic auxetic materials were first produced in the late 1980's by mechanical deformation of open cell polymeric foams. Subsequent techniques have aimed to produce honeycomb style polymeric materials or materials formed by particles linked by fibrils.

Figure 1A:
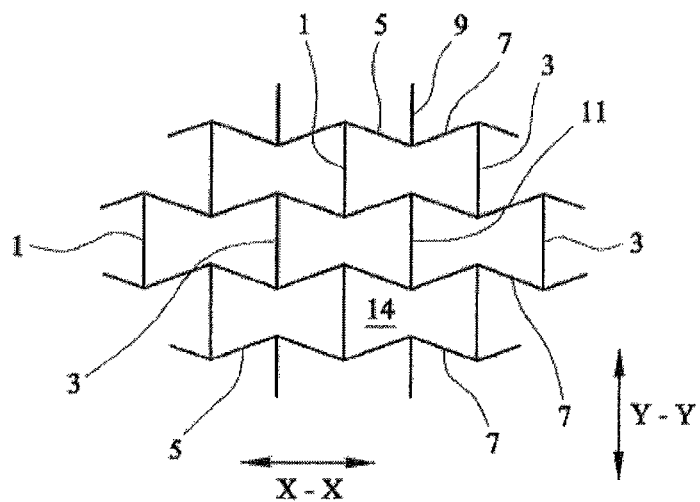
FIG. 1a is an illustration of a first prior art form of auxetic material.

An example of a honeycomb style auxetic polymer material is illustrated in FIG. 1a. Applying a tensile load along axis X-X causes stems 1 and 3 to move apart. However, this movement cause the stems 5 and 7 to straighten and thus increase the separation of stems 9 and 11. The result is an increase in the extent of the material along axis Y-Y which is perpendicular to axis X-X.

Figure 1B:
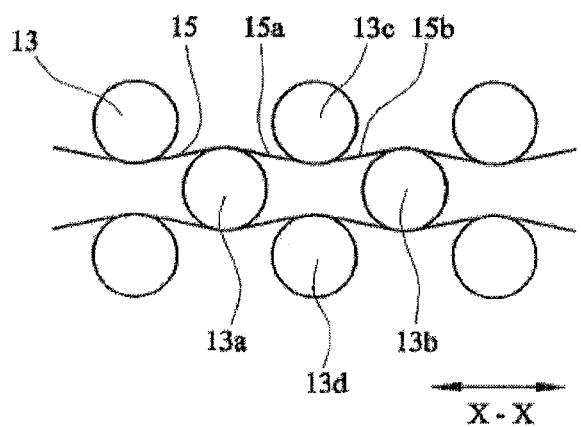
FIG. 1b is an illustration of a second prior art form of auxetic material.

An example of a particle & fibril based auxetic polymer material is shown in FIG. 1b. This provides a series of particles 13 which are linked by fibrils 15. The fibrils 15 are generally produced from the same material as the particles 13 by the extrusion and/or subsequent spinning process. Again, moving particles 13a and 13b apart along axis X-X causes the fibrils 15a, 15b to straighten and hence increase the separation of particles 13c and 13d. An increase in the materials extent along axis Y-Y, perpendicular to axis X-X, thus occurs. Such materials have been produced using compaction and sintering stages, or as detailed in WO-00/53830, by partially melting and then extruding the single polymeric material.

A variety of techniques for producing auxetic materials have been suggested, with quite varying form and level of negative Poisson ratio. In many cases, however, the production method is complicated and generally suited to producing only very small amounts of auxetic material of questionable consistency. In other cases, the nature of the process, surface melting and extrusion to form the material from a single material, results in an auxetic material which is far less even in structure and properties than is implied in the schematic representations thereof in the prior art and FIGS. 1a and 1b of this document. Cross-linking of particles, incomplete fibril structures, non-discrete particles and other problems are encountered. Substantial difficulties also exist in turning such prior art auxetic material samples into useful shapes or forms.

The present invention seeks to address these issues and provide an auxetic material which is relatively easy to produce, is consistent in its structure and properties, has an appreciable and controllable negative Poisson ratio and can readily be used to form more complex and useful forms.

Referring to FIG. 2 the auxetic material of the present invention is in effect a composite component made up of a number of components. Here it is illustrated in a partially strained state. Contrary to prior art auxetic materials the present material is formed of a number of separate components and potentially of separate components having different material form or properties.

Running through the centre is a core component 20. This core component 20 is generally linear in configuration and provides the core for a composite structure. The core component 20 also defines an axis of the structure, X-X. To either side of the core component 20 are first components 22a, 22b. The first components 22a, 22b are provided in conjunction with second components 24a, 24b. In each case, the first component 22 is wrapped around the second component 24 in a spiralling manner. That is to say, the first component 22 contacts a different part of the circumference of the second component 24 as progress is made along the components 22, 24. As a result of this wrapping, the first component 22 at least, has an extent of displacement relative to the axis X-X which varies with position along the axis X-X. Thus at location 28 the displacement is greater than at location 26.

The extent of displacement of the other first component 22b relative to the axis X-X is of the same extent for the same position 26, 28 etc along axis X-X, but the direction of displacement may be in the opposite direction relative to the axis X-X. Hence, parts 32 of the first component 22b are close to one another and parts 30 of the first component 22b are relatively far apart. This is achieved by wrapping the first components 22a, 22b around the second components 24a, 24b in opposing directions.

In the illustrated case, both the first component 22 and second component 24 have a displacement relative to the axis X-X which varies with position along the axis X-X. The overall composite component thus provides through openings 34 of a given size.

Figure 4:
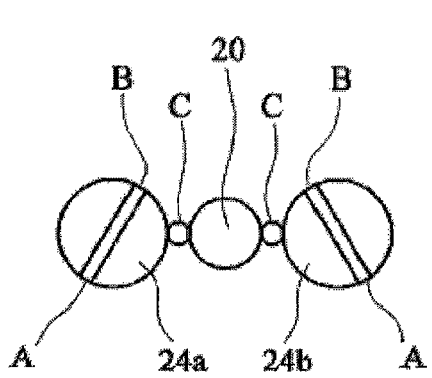
FIG. 4 is a schematic cross-sectional view, viewed along axis X-X.

The overall form can be seen in the schematic cross-sectional view, viewed along axis X-X, of FIG. 4. In this cross-sectional view the first component 22 starts at point A and advances up and over the second component 24 to point B, before descending the other, inside of the second component 24 to point C. There is a mirror image on the opposite side of the core element. The full transition of the first component 22 and full extent of the second component 24 is not shown.

In use, FIG. 3, if a tensile load is applied, parallel to axis X-X, to the first components 22 of the composite component then that load straightens the first components 22 from their helical configuration to a straighter or even straight configuration. In FIG. 3 the core component 20 still occupies the centre of the composite component and the first component 22 is still wrapped around the second component 24. However, the straightening of the first components 22 has led to an increase in the diameter of the helix formed by the second components 24. The level of displacement of the second component 24 away from the axis X-X has the net effect of considerably increasing the overall extent of the composite component along axis Y-Y. The size of the openings 34 also significantly increases.

As an alternative to helical forms for both the first components 22 and second components 24, a functioning composite component could be provided using a linear second component 24 and wrapped, displacement varying along the length, first component 22. This form is not illustrated in the Figures. In this case, the application of the tensile load would again straighten the first components 22 and hence cause the second components 24 to move from linear to helical form. Again an increase in the extent perpendicular to the direction of the tensile load occurs.

Whilst different relative dimensions for the core component 20, first components 22 and second components 24 are illustrated in FIGS. 2, 3 and 4, a wide variety of different sizes are possible, both in absolute terms and in terms of the relative sizes of the different components to one another.

In a preferred embodiment of the invention the core component 20 is itself a further auxetic component or structure, but may also be an elastomeric rod of intermediate or low modulus. It is desirable that the core component be capable of deformation without fracture. Suitable materials include siloxane, liquid silicone rubber, natural rubber, nitrile rubber or any other elastomeric material whether natural or manmade. In the event that the core component is a hollow tube, the tube may contain additional materials that may or may not be auxetic, and the additional materials may have different properties to the tube. The first components are desirably of high modulus of elasticity, for instance carbon fibre, kevlar, glass fibre, or wire. The second components are again desirably elastomeric in nature. A very wide range of materials can be employed, however, dependant on the desired properties, application and scale of the resultant composite structure. Further possibilities are outlined later in this document.

The composite component of FIGS. 2, 3 and 4 is in effect a structure from which larger structures or articles can be formed.

Figure 5:
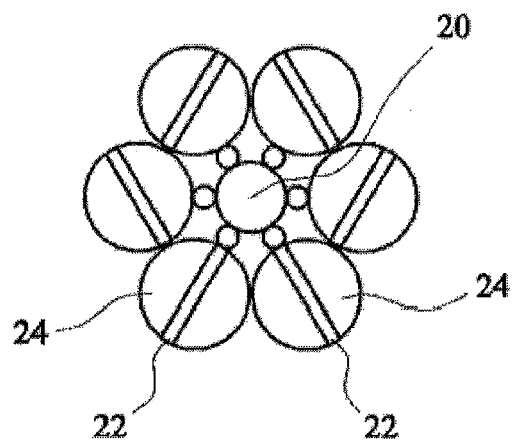
FIG. 5 is a schematic cross-sectional view of an alternative auxetic composite structure according to the present invention.

In FIG. 5 an alternative structure is illustrated in cross-sectional end view. The structure is an expanded version of the structure illustrated above in the FIGS. 2, 3 and 4 form of the invention and uses similar principals. In this case, the structure again features a central core component 20, but is provided with six second components 24 evenly positioned around the perimeter of the core component 20. Each of the second components 24 is provided with a first component 22 wrapped around it. Again the extent of the displacement of the first component from the axis running along the centre of the structure is the same for each of the first components at the same position along the axis. The direction of the displacement for each component is radially away from the axis. In the case of this structure, application of a tensile load causes expansion in all directions radially away from the core component 20. A similar arrangement may be constructed using more or less than six first and second component combinations.

Whilst the structures described in relation to FIGS. 2, 3, 4 and 5 offer negative Poisson ratio materials, the most useful forms of the present invention arise from the formation of finished articles out of such units e.g. to form fabrics, sheets, woven articles, non-woven articles. These involve the use of multiple structures of the type described above, or other such structures.

Figure 6:
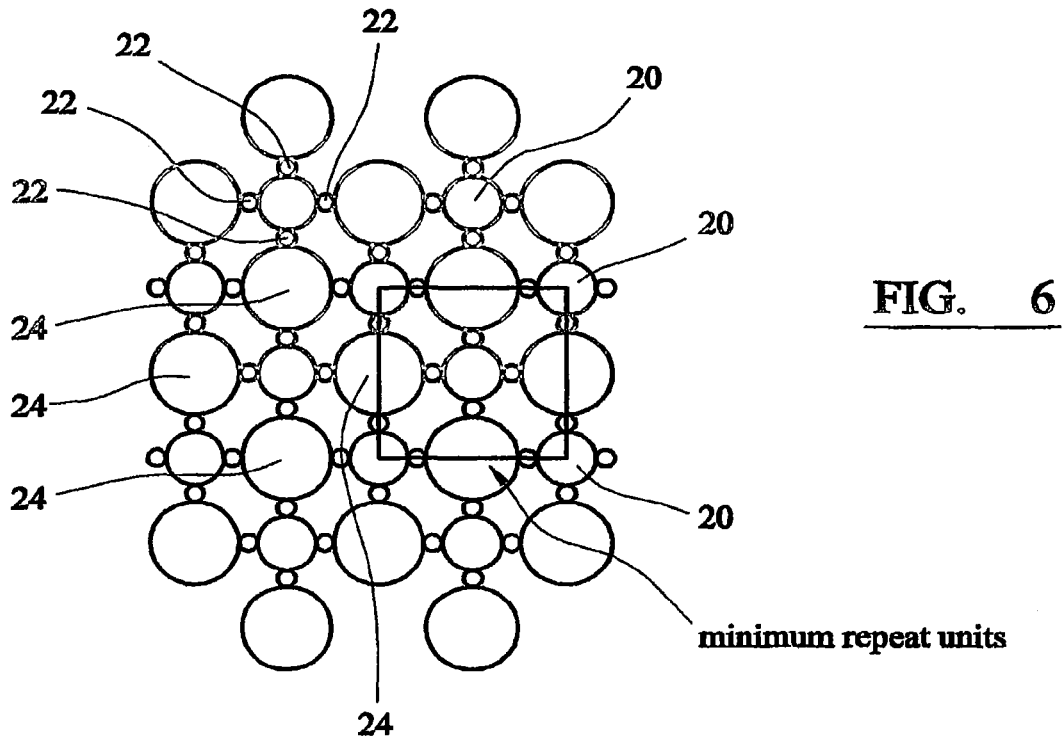
FIG. 6 is a schematic cross-sectional view of an alternative auxetic composite structure according to the present invention and provides a body centred lattice arrangement.

In the case shown in FIG. 6, each core component 20 is surrounded by four first components 22 and four second components 24, these being wrapped around one another to give the previously described combinations. The four combinations are evenly positioned around the core component 20. By providing a large number of structures in this way a body centred lattice is formed.

Figure 7:
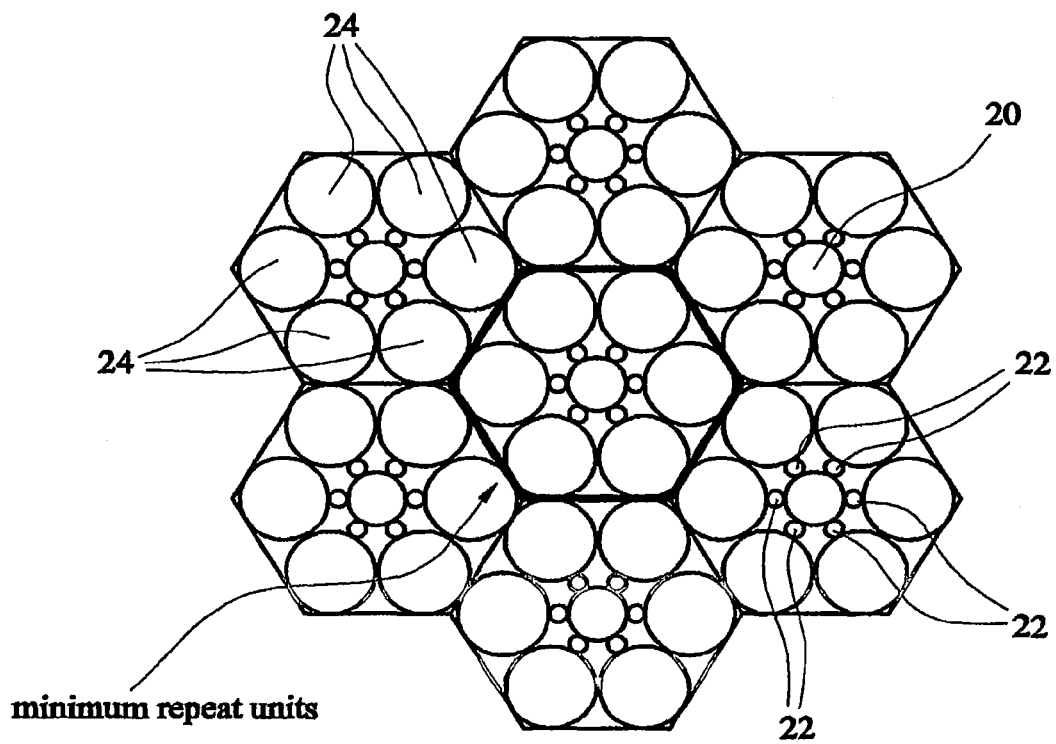
FIG. 7 is a schematic view of a close packed auxetic composite structure arrangement provided according to the present invention.

In the case shown in FIG. 7, each core element 20 is surrounded by six first component 22 and second component 24 combinations. Again the six combinations are evenly positioned around the core component 20 and provide a close-packed arrangement as a result. Similar arrangements may be constructed using more or less than six first and second component combinations.

These and other packing patterns allow substantial structures to be generated which are auxetic in behaviour. Most importantly, when compared with prior production techniques, as the auxetic structure is assembled from a number of components it is highly suited to mass production using variations on existing equipment designs that are relatively simple to implement. For instance, it would be possible to extrude the core component and use spinerettes to create the first component and second component combinations. The number of first component and second component combinations for the desired form can then be assembled around the core component. Assembly of multiple combinations provided in this way gives the desired bulk structure.

In addition to the material composition produced from core, first and second components it is possible to include supplemental materials. In a preferred form the auxetic properties of the structure are supplemented by filling the voids in the structure with siloxane foam, polyurethane foam or other low modulus of elasticity materials. Further components or elastomeric rods can be included in the voids. The introduction of such materials to the formed product is also possible using industrial scale processes.

It should also be noted that the FIGS. 2, 3, and 4 forms of the invention describe a structure that is strained to increase its extent perpendicular to the axis of strain. It is perfectly possible for the material to be pre-strained or pre-tensioned and exhibit its auxetic properties when the strain/tension is released and/or when compression is applied.

In addition to mathematical calculations as to the level of negative Poisson's ratio exhibited by such materials the applicant has been able to experimentally demonstrate such properties.

Referring to FIG. 8a to f an experimental structure according to the present invention is provided. The structure is formed of two of the composite components 100 illustrated in FIG. 8a. Two composite components 100 are provided in proximity with one another and each include a second component 104 that has a first component 102 wound around it. The first components 102 are wound in opposing directions. Such a structure is shown in FIG. 8b unstrained.

As a strain is applied to the structure, the auxetic properties are visible. In FIG. 8c a longitudinal 10 mm strain gives expansion of the gap between the components. The FIG. 8d longitudinal 15 mm strain, FIG. 8e longitudinal 20 mm strain and FIG. 8f longitudinal 25 mm strain give increasing gaps due to the sideways expansion of the structure.

The effect is clearly illustrated in FIGS. 9a and 9b which compare the projected angle of the first component relative to an axis perpendicular to the core axis of the structure. In this instance, in an unstrained state, an angle of 62° is observed, and in a partially strained state an angle of 74.5° is observed.

As well as producing structures of this configuration using various component forms it is possible to generate such structures on a wide range of scales. Macro rods and fibres can be used to form bulk composite structures suitable for a variety of uses. At the other end of the scale various organic polymeric, inorganic polymeric or inorganic structures may be used to achieve molecular size auxetic materials.

The auxetic composites and structures provided by the present invention offer a wide variety of beneficial properties. In particular, such structures may offer enhanced shear modulus, fracture toughness, piezoelectric properties, indentation resistance, thermal shock resistance, impact absorption, wear resistance and energy absorption over conventional materials. Usefully auxetic composites and structures according to the present invention may provide both impact and acoustic absorbing properties in a single material. There is also potential for these structures to display anisotropic effects where properties are different in axial and radial directions.

Such composites and structures are seen as having particular application as textile materials for a wide variety of purposes. The auxetic structures of the present invention are particularly useful in the context of textiles due to their synclastic ability (the ability to form curves in two directions pointing in the same way). This makes such textiles particularly well fitting to other items they contact. This is true of both non-clothing, for instance crash helmet linings, and clothing type applications, for instance, comfortable body armour or clothing straps and/or belts.

Applications for such composites and structures include situations where indentation resistance or the ability to absorb impacts are desirable, including car bumpers, car interior components, and moulded body parts. These properties also render such structures useful in the area of sports equipment where impact protection in the form of clothing or additional equipment is desirable. Such equipment includes head protection, shin pads, other pads and the like.

The ability to offer acoustic damping from the same material which provides the above mentioned properties is also useful as previously two separate materials, one aimed at each issue were needed.

The materials in the present invention also offer benefits in terms of their suitability for protecting hand held electronic devices, mobile phones, cameras, videos and the like e.g. for vibration, acoustic damping, or indentation resistance etc.

Other potential applications include use in tyres, medical sutures, composites with enhanced properties (particularly through reduced fibre pull-out failures), electronic sensors (especially through the construction of pressure sensitive or optically sensitive materials), seat belts, luggage straps, clothing straps, doubly-curved structures, active materials (particularly filters), active textiles, enhanced wear reduction applications, thermal shock applications, etc. There are many potential methods by which such materials may be manufactured—these include braiding, knitting, spinning, extrusion, and embroidery, as well as a variety of woven and non-woven techniques.

The invention claimed is:

1. A structure comprising two or more composite components and at least one core component disposed directly between at least two of the composite components, each of said composite components having a negative effective Poisson's ratio, each composite component comprising: a first component and a second component, the first component and the second component extending longitudinally relative to an axis, the first component being provided around the second component through one or more turns, the one or more turns being spaced longitudinally relative to the axis, wherein variation in tensile or compressive load on the first component causing variation in radial position of the second component relative to the axis;

wherein the first component has a higher modulus of elasticity than the second component;

wherein the first component is arranged around the second component in a helical manner, wherein the variation in the tensile or comprehensive load on the first component causing variation in the diameter of the helix of the first component, the variation in the diameter of the helix of the first component causing the second component to form a helix and/or causing variation in the diameter of the helix of the second component, so that the diameter of the second component helix increases as the diameter of the first component helix decreases, and the diameter of the second component helix decreases as the diameter of the first component helix increases;

wherein the diameter and/or cross-sectional area of the first component is less than that of the second component;

wherein the first component of a first composite component is wrapped around the second component of the first composite component in one direction in the helical manner and the respective first component of a further composite component is wrapped around the respective second component of the further composite component in the helical manner in the opposite direction, wherein the first composite component is a mirror image of the further composite component.

2. A structure according to claim 1, comprising at least one pair of composite components, said composite component being arranged adjacent to one another or in contact with one another.

3. A structure according to claim 1, wherein the structure is formed from repeats of a unit comprising multiple composite components.

4. A structure according to claim 1, wherein each composite component is adjacent to or in contact with two or more other composite components, so as to form a planar or sheet type structure.

5. A structure according to claim 1, wherein each composite component is adjacent to or in contact with four or more other composite components.

6. A structure according to claim 1, further comprising additional core components.

7. A structure according to claim 1, in which the core component is a fibre wherein said fibre is solid or hollow.

8. A structure according to claim 6, comprising three components provided to allow initial movement or no movement of the components over each other.

9. A structure according to claim 1, comprising one or more matrix components.

10. A structure according to claim 9, in which the matrix component resists the movement of the second component caused by load variation and/or encourages the return of the second component to the radial position it occupied prior to load variation.

11. A structure according to claim 1, which has the energy absorbing, impact absorbing and/or acoustic absorbing characteristics.

12. A structure according to claim 1 wherein the first composite component is wrapped clockwise and the further composite component is wrapped anti-clockwise.

13. A structure according to claim 12 wherein two composite components are opposite each other and are mirror images of each other.

14. A textile or fabric comprising a structure according to claim 1.

15. A structure according to claim 1, wherein the first component of the first composite component is sealed with at least one cured film.

16. A structure according to claim 15, wherein the at least one cured film is a cured siloxane film.

17. A structure according to claim 1, wherein the second component of the first composite component comprises a siloxane-based elastomeric material.

18. A structure according to claim 1, wherein the second component of the first composite component comprises a silicone rubber.

* * * * *